United States Patent [19]
Muramatsu et al.

[11] Patent Number: 5,823,510
[45] Date of Patent: Oct. 20, 1998

[54] SINTERED CERAMICS MATERIAL AND DISK VALVE ASSEMBLY

[75] Inventors: Katsutoshi Muramatsu; Toshiaki Kaneko; Kouichi Kiyohara, all of Kuwana; Kenji Ito, Ama-gun; Yoshimi Nishihara, Kuwana; Hiroyuki Inoue; Makoto Ishihara, both of Gifu, all of Japan

[73] Assignee: NTN Corporation, Japan

[21] Appl. No.: 647,762

[22] Filed: May 15, 1996

[30] Foreign Application Priority Data

| May 16, 1995 | [JP] | Japan | ..................................... 7-142671 |
| Jul. 31, 1995 | [JP] | Japan | ..................................... 7-195048 |
| Mar. 6, 1996 | [JP] | Japan | ..................................... 8-079518 |

[51] Int. Cl.$^6$ ...................................................... E03B 1/00
[52] U.S. Cl. ................ 251/368; 137/625.17; 137/625.41
[58] Field of Search ....................... 251/368; 137/625.17, 137/625.41

[56] References Cited

U.S. PATENT DOCUMENTS

| 4,420,142 | 12/1983 | Dworak et al. .......................... 251/368 |
| 4,763,876 | 8/1988 | Oda et al. ................................ 251/368 |
| 4,932,432 | 6/1990 | Berchem .................................. 251/368 |
| 4,932,438 | 6/1990 | Kitamura et al. ......................... 251/368 |
| 5,494,258 | 2/1996 | Weissgerber et al. ................... 251/368 |

*Primary Examiner*—A. Michael Chambers
*Attorney, Agent, or Firm*—Wenderoth, Lind & Ponack, L.L.P.

[57] ABSTRACT

A ceramics material for a sliding member used in the water or brought into contact with water is proposed. It is low in frictional resistance and high in wear resistance and shows a long life when used in such a condition. Also, a disk valve assembly is proposed which has a valve body and a valve seat having sliding surfaces that are high in sliding properties. By sliding the valve body on the valve seat having valve holes, the valve holes can be opened and closed. One of the valve seat and the valve body is made of a self-lubricating ceramics material comprising of an oxide ceramic as a main component, and at least one anti-friction agent selected from the group made up of iron, nickel, cobalt and their oxides, nitrides and carbides. The other of the valve seat and the valve body is made of an aluminum oxide ceramics material and has a larger slide contact area than the one of the valve seat and the valve body.

7 Claims, 7 Drawing Sheets

FIG. 1
NON-LUBRICATED (IN DRY STATE)

FIG. 2
LUBRICATED WITH WATER

SINTERED CERAMICS MATERIAL AND DISK VALVE ASSEMBLY

BACKGROUND OF THE INVENTION

This invention relates to a sintered ceramics material which is low in frictional resistance and suitable for use as a sliding member under water-lubricated conditions, a sintered ceramics material which shows excellent corrosion resistance in a corrosive environment or in boiling water, and a disk valve assembly made of such ceramics material.

Sliding or rolling members of a machine part which are made of a sintered ceramics material are usually used in the presence of films of oil or grease to reduce the frictional resistance at their sliding surfaces.

Heretofore, in applications where the use of such oily lubricants is objectionable, use was made of a silicon nitride-silicon carbide porous ceramic impregnated with such solid lubricants as graphite, molybdenum disulfide, boron nitride, fluororesin and paraffin wax (Examined Japanese Patent Publication 5-50475).

Some of conventional wear-resistant articles such as cutting tools are composite members made of a two-phase matrix consisting of a silicon nitride phase and a high-density additive phase with hard refractory particles dispersed therein. Such refractory material is selected from such metals as titanium, molybdenum, tungsten and tantalum and their carbides and nitrides (Unexamined Japanese Patent Publication 57-51175).

But for sliding members that are used in the water or wetted with water, such as slide bearings for a water pump, it is often impossible to use such oily lubricants. In such a case, sliding members have to be used with no lubrication, so that the frictional resistance at the sliding surfaces tend to increase, which in turn increases the driving force needed to move the sliding members and shortens the life of such sliding members.

Ceramic sliding members impregnated with solid lubricants as mentioned above lack water-tightness because of their porous nature. Strength is thus low. Also, since these solid lubricants are rather expensive, the manufacturing cost tends to be high. Solid lubricants also hamper sintering of ceramics, making it difficult to increase the density of sintered ceramics.

Composite members in which are dispersed hard refractory particles have several problems, too. One problem is that the manufacturing cost is high because expensive refractory metals and their compounds are used. Also, it is difficult to determine sintering conditions such as the sintering temperature and the kind of densifyng agent for increasing the density of the sintered ceramics. The sintered ceramics thus formed show high frictional resistance.

Ceramic sliding members used in water include mechanical seals, tube linings and hot-water-submerged protective pipes, which are used in acidic, alkaline and corrosive environments or in boiling water. High corrosion resistance is required for these ceramic members. Thus, conventional sliding members of this type are made of non-oxide ceramics such as silicon carbide. It is a complicated process to sinter silicon carbide, because it has to be sintered at high temperatures in an inert atmosphere. Such sintered ceramics were thus difficult to mass-produce. One may therefore be tempted to substitute less expensive, easy-to-sinter oxide ceramics for non-oxide ceramics. But oxide ceramics such as alumina are easily corroded by acids and alkalis. If the purity of such oxide ceramics is lowered for easy sintering, they will corrode markedly (as discussed in "New Ceramics", page 20–21 published in 1994 by Chijin Shokan).

A first object of this invention is to provide a sintered ceramics material for a sliding member used in water or wetted with water which is low in frictional resistance and high in wear resistance and which shows a long life when used in such a condition.

A second object of this invention is to provide a sintered ceramics material which is in the form of an oxide ceramic such as alumina having improved corrosion resistance and which can be used in a corrosive environment or in boiling water.

Figure 6:
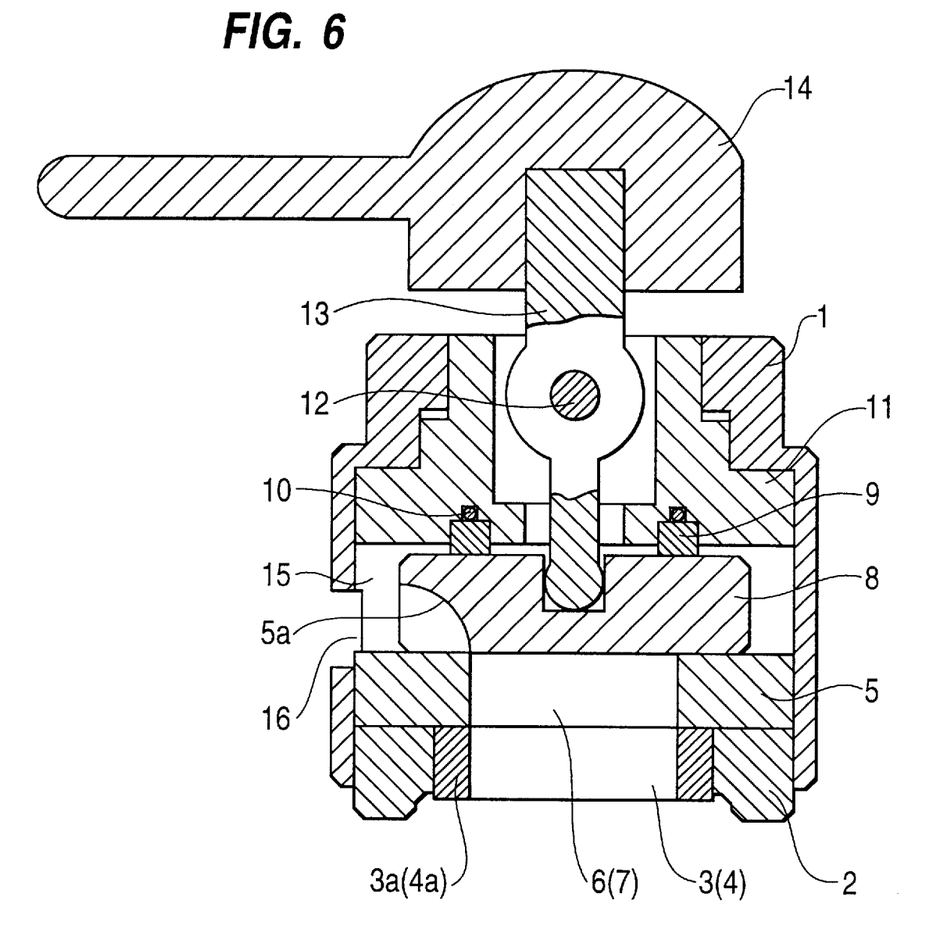
FIG. 6 is a vertical sectional view of a disk valve assembly of one embodiment.
Figure 7A:
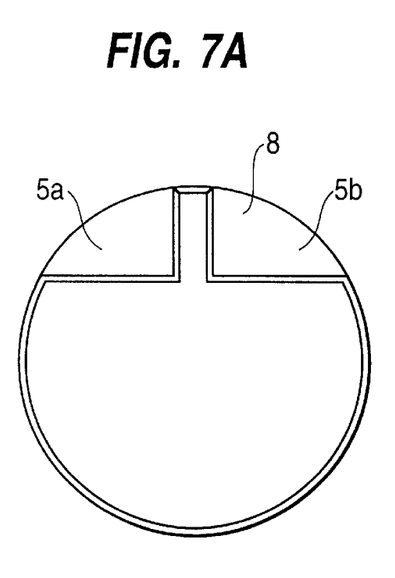
FIG. 7A is a bottom plan view of the valve body of FIG. 6.
Figure 7B:
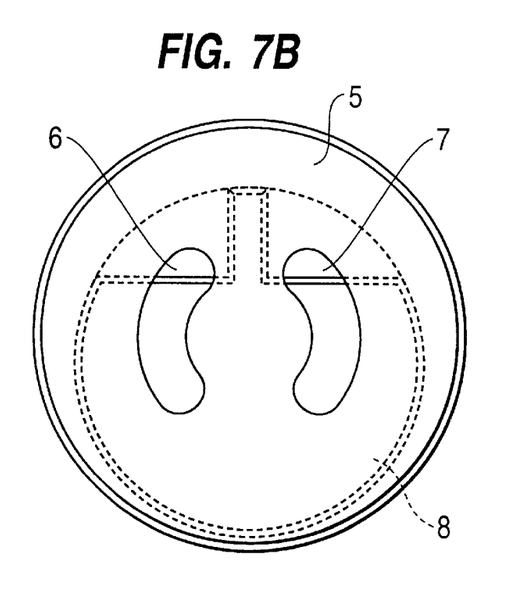
FIG. 7B is a top plan view of the valve seat of FIG. 6.

FIGS. 6 and 7 show a conventional disk valve assembly of the type that can mix hot and cold water together.

It includes a bottom plate 2 mounted in a valve box 1 at its bottom and having two inlet holes 3 and 4 (only one is shown) in which are fitted annular packings 3a and 4a (only one is shown). A valve seat 5 is superposed on the bottom plate 2. It has two valve holes 6 and 7 (only one is shown) communicating with the inlet holes 3 and 4, respectively. A valve body 8 is slidably placed on the valve seat 5. The valve body 8 in turn rotatably supports a lever holder 11 through a sliding seal ring 9 and an O-ring 10. Coupled to the lever holder 11 is the bottom end of a lever shaft 13 supported on a pin 12. By turning the lever shaft 13 up and down or right and left by controlling a lever 14, the valve body 8 slides on the valve seat 5, so that the degrees of opening of the valve holes 6 and 7 are varied.

The valve body 8 has two water passages 5a and 5b formed by cutting out the valve body 8 along its bottom edge. Hot water and cold water guided into the valve holes 6 and 7 through supply pipes flow out into the respective passages 5a and 5b and then into a water mixing chamber 15 by opening the valve holes. Warm water, which is the mixture of hot and cold water supplied from the valve holes, is thus delivered to the unshown outlet of the faucet.

Unexamined Japanese Patent Publication 63-36765 discloses a disk valve of this type. In order to improve the sliding properties of its valve body 8, one of the valve body 8 and valve seat 5 is made of a resin having self-lubricity such as a fluororesin or an ultra-high-molecular polyethylene, or a resin containing a filler capable of improving the lubricity of the resin such as molybdenum disulfide and carbon, while the other is made of a ceramic material.

One problem of a valve body made of such a self-lubricating resin is its low creep resistance. Even if a fibrous reinforcer is added to the material of the valve body, its leakproofness is so low that it can prevent water leakage only while the water pressure is low.

In contrast, a valve body or seat made of a ceramics material is sufficiently hard and highly resistant to water pressure. Unexamined Japanese Patent Publication 4-351379 discloses a disk valve assembly whose valve body or seat is made of an aluminum oxide ceramics material and has a sliding surface formed with a convex crown.

A valve body or seat made of an aluminum oxide ceramics material is high in friction coefficient at its sliding surface, which will hamper smooth operation of the lever. Thus, in order to reduce the sliding resistance, a convex crown is formed on its sliding surface.

In order to improve the operability of the lever by forming a crown on the sliding surface of the valve body or seat, such a crown has to be at least 5 $\mu$m high. Such a high crown will, however, make it difficult to press the valve body closely against the valve seat and thus to prevent water leakage.

Unexamined Japanese Patent Publication 63-38722 proposes to use a valve body made of a porous material having a Vickers hardness of 200 kg/mm² or higher and impregnated with lubricant to improve the sliding properties of the sliding surface.

But this valve body has a problem in that the lubricant tends to be worn or flow out while in use, so that smooth operation of the lever becomes increasingly difficult with time. Also, its leakproofness tends to drop after long use.

Ceramic valves that utilize solid lubricants are also known. For example, Unexamined Japanese Patent Publication 6-48836 discloses a valve body made of a self-lubricating, silicon carbide-carbon ceramics material.

This valve body is high in wear resistance and the lubricant is less likely to flow out. But if a large amount of carbon is added to improve its sliding properties to a level required for a disk valve, the valve body will suffer a drop in strength and become brittle. Such a valve body is less durable.

Especially if a valve seat, having a larger slide contact area than a valve body, is made of such a brittle material, its sliding surface tends to be abraded unevenly and roughen markedly by being unevenly abraded by the valve body. The thus roughened surface will increase the friction coefficient or cause water leakage.

Thus, even though such conventional valve bodies and seats are made of a self-lubricating ceramics material, it is difficult to maintain their mechanical strength and sliding properties at a level required for disk valves for a long time.

An third object of this invention is therefore to provide a disk valve assembly comprising a valve body and a valve seat both made of a ceramics material and kept in close sliding contact with each other so that they can positively prevent leakage of water or any other liquid for a long time, while keeping such a friction coefficient therebetween that permits smooth movement of the valve body.

SUMMARY OF THE INVENTION

According to the first invention, there is provided a sintered ceramics material which shows high sliding properties under lubrication with water, the sintered ceramics material being formed by sintering a material comprising an oxide ceramics material, and at least one anti-friction agent selected from the group consisting of iron, nickel, cobalt and their oxides, nitrides and carbides.

The anti-friction agent reduces the friction coefficient and the sliding resistance at the sliding surface under water lubrication. Thus, the sintered ceramic body is excellent as a sliding member for use in water and increases the life of the sliding member.

In another arrangement, a corrosion-resistant sintered ceramics material in the form of a single-phase $\alpha$-$Al_2O_3$ solid solution, the sintered ceramics material being formed by sintering in the atmosphere a mixture of aluminum oxide powder and iron or its oxides.

The iron or its oxides increases the sinterability and density and serves as an anti-friction agent. Thus the alumina sintered body can be used as a sliding member in a corrosive solution.

The anti-friction agent is inexpensive and does not require any special sintering process. Thus, it is suitable for forming a sliding member.

To solve the third problem, the disk valve according to this invention has a valve seat and a valve body. At least one of them is made of a self-lubricating ceramics material comprising an oxide ceramic as a main component, and at least one anti-friction agent selected from the group consisting of iron, nickel, cobalt and their oxides, nitrides and carbides. Such a valve body or seat is hard and highly wear-resistant. Iron, nickel, cobalt or their oxide, nitride or carbide that is added as the anti-friction agent serves to stably keep the friction coefficient at a low level.

The disk valve assembly according to the present invention has a valve seat formed with valve holes and a valve body kept in sliding contact with the valve seat to open and close the valve holes, characterized in that one of the valve seat and valve body is made of a self-lubricating ceramics material comprising as a main component an oxide ceramic containing at least one anti-friction agent selected from the group consisting of iron, nickel, cobalt, and their oxides, nitrides and carbides, and the other of the valve seat and valve body is made of an aluminum oxide ceramics material.

Also, the area of the sliding surface of the valve seat or body made of a self-lubricating ceramics may be smaller than that of the sliding surface of the valve seat or body made of an aluminum oxide ceramics.

On the valve seat and the valve body having sliding surfaces kept in sliding contact with each other, each sliding surface may be formed with a convex crown rising smoothly from the outer edge of each sliding surface to a height of 0.1–1 $\mu$m at its center, the sum of the heights of the crowns formed the sliding surfaces being not more than 1.6 $\mu$m.

If the valve seat or body is made from an aluminum oxide (alumina) ceramics material comprising aluminum oxide ($Al_2O_3$) as the main component, and iron oxide ($Fe_2O_3$) as the anti-friction agent, iron in the iron oxide is densely distributed in the form of a solid solution in the alumina particles ($Al_2O_3$) during sintering.

When this valve body or seat is brought into contact with water, while kept in slide contact with the mating member, the solid solution comprising alumina and Fe presumably corrodes due to tribochemical action, producing hydroxides, which are softer than the alumina substrate, on the sliding surface. It is believed that these hydroxides reduce the friction coefficient. It is also believed that, since the ceramics material forming the valve body or seat has an increased affinity for water, the water present between the valve body and the valve seat serves as a kind of lubricant, thus further reducing the friction coefficient.

Water will act like a lubricant in the above manner not only if the valve body or seat is made of a combination of aluminum oxide and iron oxide, but also if an ordinary ceramics material is used in which are dispersed minute metal particles of iron, nickel, cobalt or their oxide, nitride or carbide.

The valve body or seat made of the abovementioned ceramics material has a crown on the sliding surface which smoothly rises from the outer edge to a predetermined height at the center. Such a crown serves to reduce the contact area between the valve body and the valve seat, thus further improving the lubricity attributable to the ceramics material. The sliding resistance thus markedly decreases, so that the valve body can be moved extremely smoothly, while preventing water leakage. Moreover, both of these properties, i.e. low sliding resistance and high leakproofness, are maintained for a long time.

By forming one of the valve seat and the valve body from a self-lubricating ceramics material having the abovementioned composition and the other from an aluminum oxide ceramic, the valve body can be more closely brought into sliding contact with the valve seat, while keeping smooth operability of the lever.

In the arrangement in which one of the valve seat and the valve body that is made of a self-lubricating ceramics material having the above composition has a smaller slide contact area than its mating member, i.e. the valve seat or body made of an aluminum oxide ceramics material, since the member having a smaller slide contact area is made of a softer material, its sliding surface is worn uniformly and thus kept smooth. The friction coefficient is thus kept low. Water is less likely to leak.

In the arrangement in which the crown formed on the sliding surface of the valve body has a continuous surface with no cutouts or openings at its center, the valve body and seat never contact each other not along a line but at points or at a small surface. This permits the valve body to smoothly slide on the valve seat in all directions. The lever operability thus improves.

Other features and objects of the present invention will become apparent from the following description made with reference to the accompanying drawings, in which:

DETAILED DESCRIPTION OF THE PREFERRED EMBODIMENT

The sintered oxide ceramics material according to the first invention is formed by sintering a mixture of an oxide ceramic as a main component and an anti-friction agent. The oxide ceramic used may be alumina or zirconia. The sintered ceramics material thus formed remains highly water-resistant in water for a long time and is high in wear resistance as well.

The anti-friction agent may be iron, nickel, cobalt or their oxides, nitrides or carbides. It is dispersed in the sintered ceramics material or present in the form of a solid solution among the oxide ceramic particles. Although its exact structure is not known, it lowers the wear resistance at the surface of the sintered ceramics material when used in contact with water. Its sliding life and other sliding properties thus improve.

In the case of the sintered alumina ceramics material in which the oxide ceramic is alumina and the anti-friction agent is iron or iron oxide, the iron oxide (probably $Fe_2O_3$) is bound to the alumina ($Al_2O_3$) particles in the form of a solid solution during sintering. This increases the density of the sintered ceramics material. When brought into contact with water, the alumina solid solution ($\alpha$-$Al_2O_3$) produces a hydroxide, which increases the affinity with a water film, thus reducing the friction coefficient when the sintered ceramic slides.

It is also possible to reduce the friction coefficient when in contact with water even if minute particles of iron, nickel or cobalt are dispersed in the sintered ceramic material.

The content of such an anti-friction agent is preferably 1–30% (by weight; "%" in the following description is by weight) in the sintered ceramics material. If lower than 1%, the friction coefficient will not decrease sufficiently. If higher than 30%, the strength of the sintered ceramic will drop.

To form such a sintered ceramics material from a mixture of an oxide ceramic and an anti-friction agent as mentioned above, the powder mixture is compression-molded to a desired shape and sintered at a high temperature. After the sintered ceramics material has been let to cool, its sliding surface is finished by grinding to provide a sliding member. In order to increase the density of the sintered ceramics material, a sintering assistant may be added in a small amount. For an alumina ceramics material, preferable sintering additives include silica ($SiO_2$), sodium oxide, calcia (CaO) and magnesia (MgO). For a zirconia ceramic material, yttria ($Y_2O_3$) or magnesia (MgO) may be used as a sintering additive.

The sintered ceramics material according to the second invention is a single-phase $\alpha$-$Al_2O_3$ solid solution which is formed by shaping a mixture of aluminum oxide (alumina) powder as an oxide ceramics material and iron or its oxide to a desired shape, and then sintering it in the atmosphere.

The iron or its oxide is melted or changes to a solid solution in the alumina matrix in an oxidized state when heated in an oxidizing atmosphere. The sintered ceramics material after cooling is a substantially completely single phase of $\alpha$-$Al_2O_3$, so that it shows high corrosion resistance in cold or hot water, or in acidic or alkaline solutions.

Iron oxide ($Fe_2O_3$) is preferable as the iron or its oxide. Its content is determined so that the sintered ceramic will have a single phase of $\alpha$-$Al_2O_3$, and preferably 0.5–18% in terms of the content of $Fe_2O_3$ in the sintered ceramic material. If less than 0.5%, the $\alpha$-$Al_2O_3$ solid solution can scarcely improve the corrosion resistance. If more than 18%, the iron oxide would not completely change into a solid solution, so that the remaining iron oxide will elute, lowering the corrosion resistance.

It is possible to determine whether or not the sintered material is made up of a substantially complete single phase of an $\alpha$-$Al_2O_3$ solid solution simply by subjecting such a sintered material to X-ray diffraction test. If no diffraction peak of metallic Fe or iron oxide is present on the chart, this sintered material has the abovementioned single-phase structure. This method is thus practical.

Iron or its oxide acts as a sintering additive for alumina. That is, while alumina alone can be sintered at 1600° C. or higher, it can be sintered at a lower temperature about 1500° C. to a sufficiently high density by adding an iron oxide thereto. Also, since its liquid phase and solid phase are both sintered, the strength of the sintered material increases. Moreover, since the material is sintered in the atmosphere, sintering steps are simple and can be carried out at low cost.

Iron or its oxide used with alumina acts as an anti-friction agent. Thus, the sintered alumina material can be used as a sliding member used in water or otherwise brought into contact with water. That is, the sintered alumina ceramics material according to the second invention can be used as a sliding member having high corrosion resistance in acidic, alkaline and other corrosive solutions.

The self-lubricating ceramics material used for a disk valve assembly according to this invention is a ceramics material comprising a matrix of an oxide ceramic such as aluminum oxide in which are dispersed minute metal particles of iron, nickel, cobalt or their oxide, nitride or carbide. That is, the sintered ceramics material according to the first or second invention is used.

Oxide ceramics employed in this invention include alumina ($Al_2O_3$), mullite (which may contain $3Al_2O_3$, $2SiO_2$-$2Al_2O_3$, $SiO_2$, FeIII, Ti) and zirconia ($ZrO_2$). That is, they are the same as the oxide ceramics used in the first or second invention. Their purity, shape and particle diameters are not limited.

In order for the oxide ceramics material to have a higher density when sintered, its particle diameter distribution should be as high as possible. On the other hand, for higher thermal shock resistance, its average particle diameter should be as small as possible. Thus, the average particle diameter of the material should preferably be 3 μm or less.

The anti-friction agent used is, as explained above, in the form of minute metal particles of iron, nickel, cobalt or their oxide, nitride or carbide. Their shape and diameter are not limited.

The anti-friction agent should be added at a rate of 1–30% by weight of the oxide ceramic which is the main component. If less than 1% by weight, it is impossible to sufficiently reduce the friction coefficient of the material when sintered. If over 30% by weight, the strength of the sintered material will drop.

In order to form a ceramic member (sintered member) from a powder mixture of the abovementioned oxide ceramic and the abovementioned anti-friction agent, the powder mixture is formed into the shape of a valve body or seat by compression molding. The compressed powder is then sintered at high temperature, and after let to cool, a sliding surface is formed thereon by grinding.

As mentioned above, a sintering additive may be added to the powder mixture at a rate of 0.5–5% parts by weight per 100 parts by weight of the self-lubricating ceramic to increase the density of the sintered member.

Each of the valve seat and the valve body should have a sliding surface formed with a crown smoothly rising by 0.1–1 μm from the edge of the sliding surface so that the sum of the heights of the crowns formed on the valve seat and the valve body should be not more than 1.6 μm. This is because a crown less than 0.1 μm in height cannot sufficiently reduce the friction partly under the influence of the surface roughness (about Ra 0.01–0.05 μm). If either of the crowns is higher than 1 μm, the contact area between the valve body and valve seat will be too small to effectively prevent water leakage.

If the sum of the heights of the two crowns exceeds 1.6 μm, the possibility of water leakage will increase even if the heights of the respective crowns are within the above predetermined range. Also, the force needed to operate the valve (which is substantially equal to the force needed to operate the lever) tends to decrease to such an extent that the valve body is moved by a very small external force or even by the weight of the lever itself. This causes the flow rate to increase or decrease or the faucet to be opened or closed against the will of an operator.

An embodiment of the disk valve assembly according to this invention is described below with reference to the drawings.

The disk valve assembly shown in FIGS. 6 and 7 includes a bottom plate 2 mounted in a valve box 1 at its bottom and having two inlet holes 3 and 4 (only one is shown) in which are fitted annular packings 3a and 4a (only one is shown). A valve seat 5 is superposed on the bottom plate 2. It has two valve holes 6 and 7 (only one is shown) communicating with the inlet holes 3 and 4, respectively. A valve body 8 is slidably placed on the valve seat 5. The valve body 8 in turn rotatably supports a lever holder 11 through a sliding seal ring 9 and an O-ring 10.

Coupled to the lever holder 11 is the bottom end of a lever shaft 13 supported on a pin 12. By turning the lever shaft 13 up and down or right and left by controlling a lever 14, the valve body 8 slides on the valve seat 5, so that the degrees of opening of the valve holes 6 and 7 are adjusted.

The valve body 8 has two water passages 5a and 5b formed by cutting out the valve body along its bottom edge. Hot water and cold water guided into the valve holes 6 and 7 through supply pipes flow out into the respective passages 5a and 5b and then into a water mixing chamber 15 by opening the valve holes. Warm water, which is the mixture of hot and cold water supplied from the valve holes, is thus delivered to the unshown outlet of the faucet.

(EXAMPLE 1)

Alumina ceramic sintered members are shown by way of examples. As an anti-friction agent, 0–30% by weight of metallic iron powder, iron oxide powder ($Fe_2O_3$) or a metallic nickel powder (any of the three had a particle diameter of 5 μm or less) was added to alumina powder. Each mixture of materials was compression-molded into the shape of a cylinder (43 mm in outer diameter, 8 mm in inner diameter and 7 mm high). The cylindrical members thus formed were sintered in a sintering furnace at 1500°–1600° C. for two hours.

Figure 3:
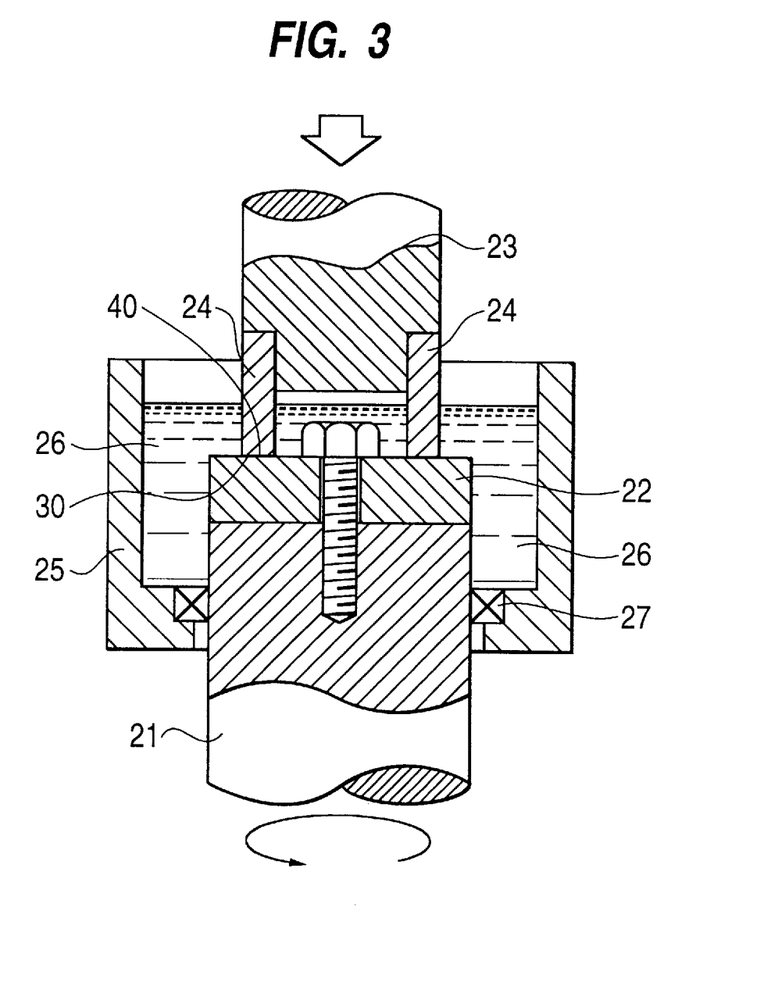
FIG. 3 is a vertical sectional view of a frictional wear tester.

The thus sintered cylindrical members had their end faces mirror-finished so that the surface roughness Ra will be 0.05–0.1 μm. The cylindrical specimens 24 thus formed were subjected to a frictional wear test.

Of these cylindrical specimens, some of those containing iron powder were sintered in the atmosphere while others were sintered in a reducing atmosphere. Those containing iron oxide were all sintered in the atmosphere. Those containing metallic nickel were all sintered in a reducing atmosphere.

As shown in FIG. 3, the frictional wear test was conducted by fixing each cylindrical specimen 24 to a support member 23 of the friction tester so that its end face (sliding surface) 40 contacts a top surface 30 of a rotary disk 22 fixed to a rotary shaft 21, and continuously rotating the rotary shaft 21 at a speed of 4 m/min with no lubrication while applying a constant load (0.39 MPa in terms of the contact surface pressure) between the support member 23 and the rotary shaft 21 to measure the friction coefficient in a non-lubricating (dry) condition.

The rotary disk 22 was made of a sintered alumina having its top surface (sliding surface) 30 mirror-finished as with the sliding surface 40 of each specimen 24.

As seen in FIG. 3, a water container 25 was watertightly mounted around the rotary shaft 21 so that water 26 in the container 25 comes into contact with the sliding surface 30 of the rotary disk 22 fixed to the rotary shaft 21 and supported by a bearing and the sliding surface 40 of the cylindrical specimen 24. In this state, the rotary shaft 21 was rotated to measure the friction coefficient in a water-lubricated condition.

Figure 1:
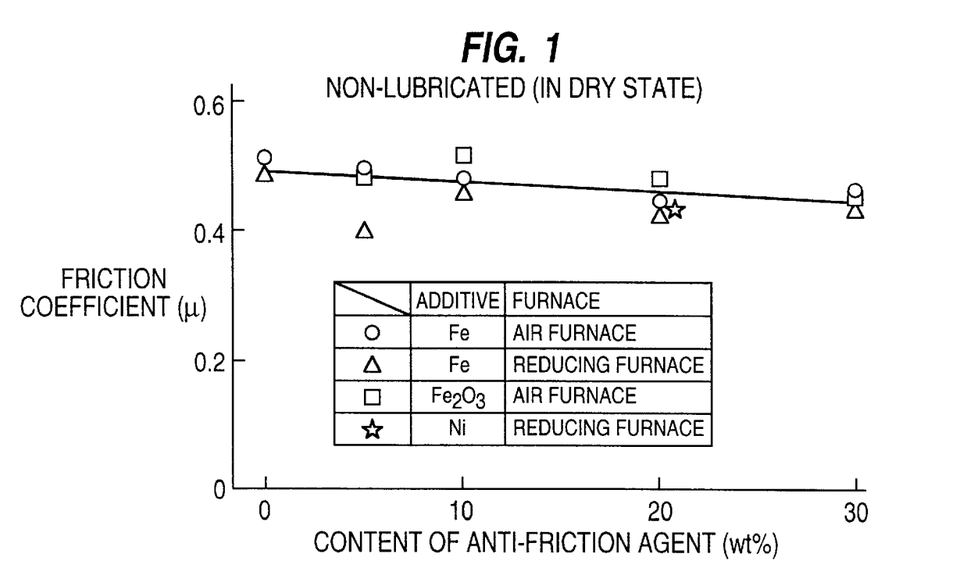
FIG. 1 is a graph showing the relationship between the content of the anti-friction agent in the sintered ceramics material and the friction coefficient in a dry lubricating condition.
Figure 2:
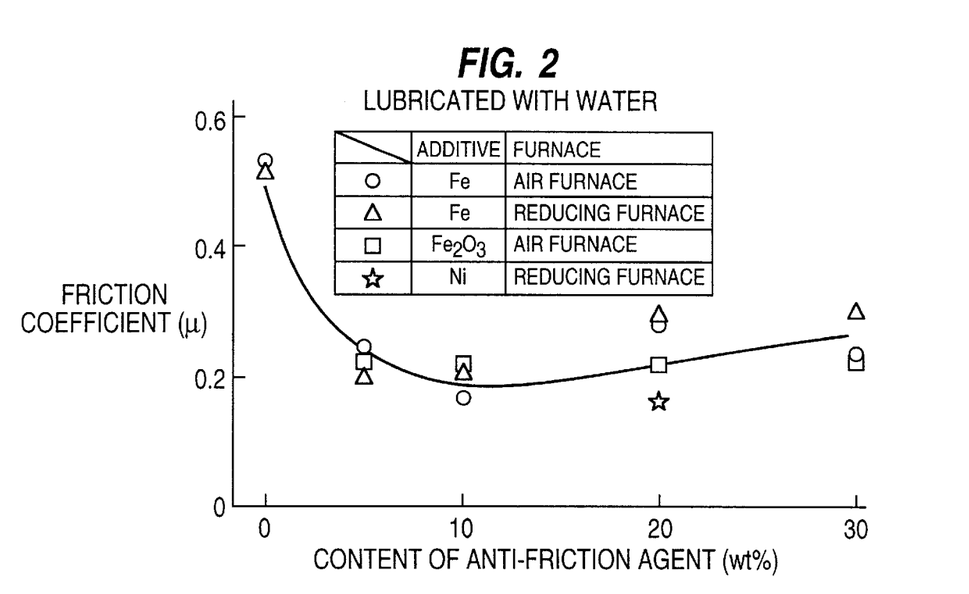
FIG. 2 is a similar graph when water is used as a lubricant.

The results of the friction test are shown in FIGS. 1 and 2 in the form of the relationship between the content of the anti-friction agent in the sintered ceramic member and the friction coefficient. The friction coefficient in a dry state varied little with the content of the anti-friction agent. As shown in FIGS. 1 and 2, the specimens containing 0% of anti-friction agent showed substantially the same friction coefficient in a water-lubricated condition as in a dry condition in spite of the fact that they were sintered under the same conditions as the specimens containing iron powder. This shows that water lubrication alone cannot reduce the friction coefficient.

As shown in FIG. 2, the friction coefficient decreased dramatically when a specimen containing 5% or more and up to 30% of anti-friction agent was lubricated with water. There was no significant difference in friction coefficient between the specimens containing metallic iron, those containing metallic nickel, and those containing iron oxide. The difference between the oxidizing atmosphere and the reducing atmosphere in the sintering furnace also had no significant influence on the friction coefficient.

(EXAMPLE 2)

Corrosion-resistant alumina sintered members are shown in this example.

Alumina powder and iron oxide ($Fe_2O_3$) were mixed at the rates shown in Table 1. The material mixtures thus formed were pulverized in a pot mill so that the average particle diameter will be 2.0 $\mu$m or less. The pulverized material mixtures were then pelletized by adding an organic binder. Test specimens 20 mm in diameter and 10 mm long were formed from these pellets. Immediately after degreasing them by calcining at 600° C. in the air, they were calcined at 1500° C. for two hours in the atmosphere. This calcining method was a conventional one.

Each test piece was tested for its corrosion resistance in 5N hydrochloric acid and 5N sodium hydroxide solutions and water. No appreciable change was observed in any test piece for a long time when they were immersed in the above liquids at room temperature. Thus, they were immersed in these liquids for three days while keeping their temperature at 120° C. with an autoclave. The loss of weight of each specimen due to corrosion was measured.

The results are shown in Table 1.

From Table 1, it is apparent that the alumina sintered members containing 1–10% $Fe_2O_3$ is higher in corrosion resistance than the pure alumina sintered member, and that the addition of 20% $Fe_2O_3$ lowers the corrosion resistance especially against hydrochloric acid.

Figure 4:
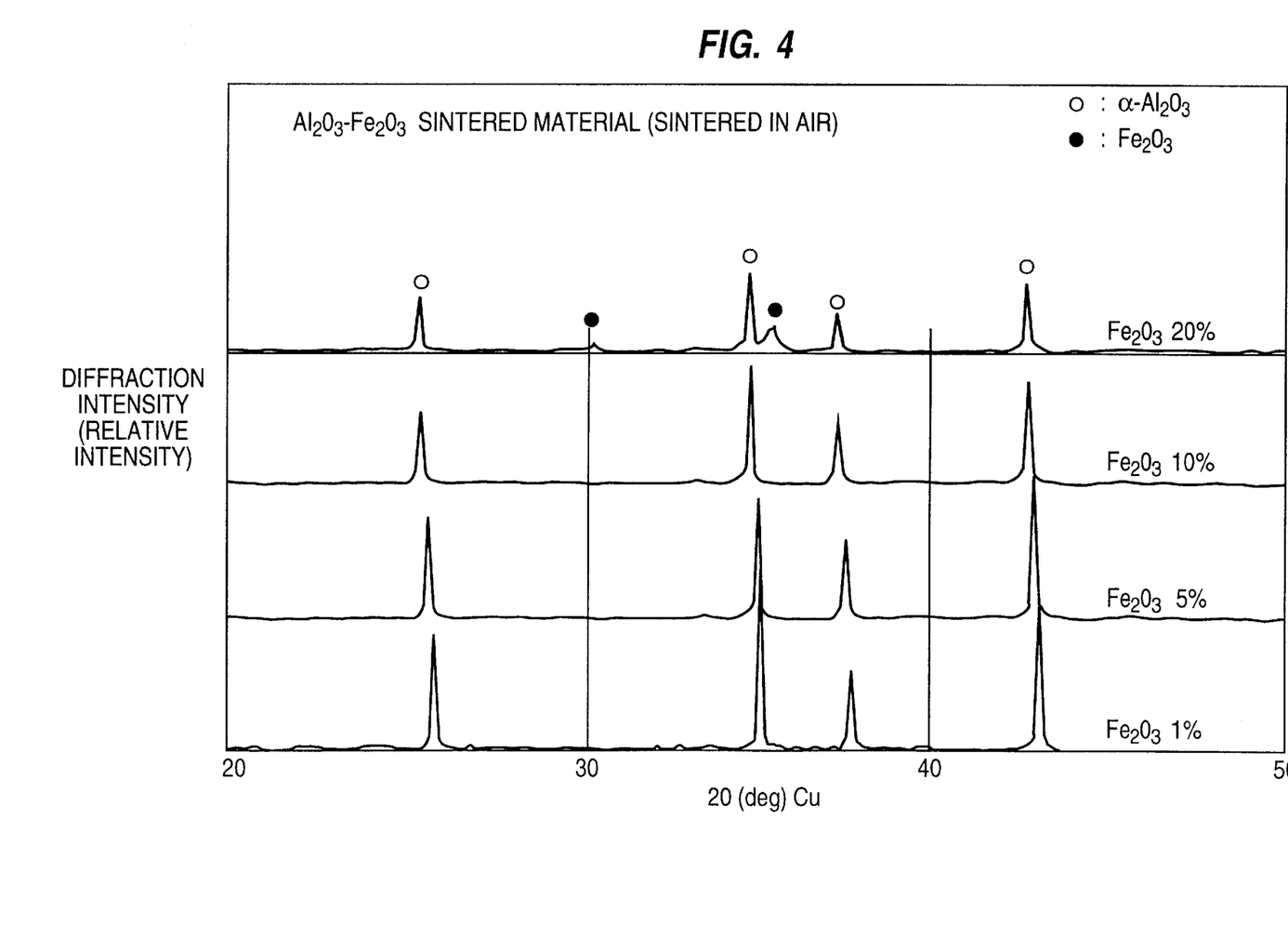
FIG. 4 is an X-ray diffraction chart of an $Al_2O_3$ -$Fe_2O_3$ sintered material.
Figure 5:
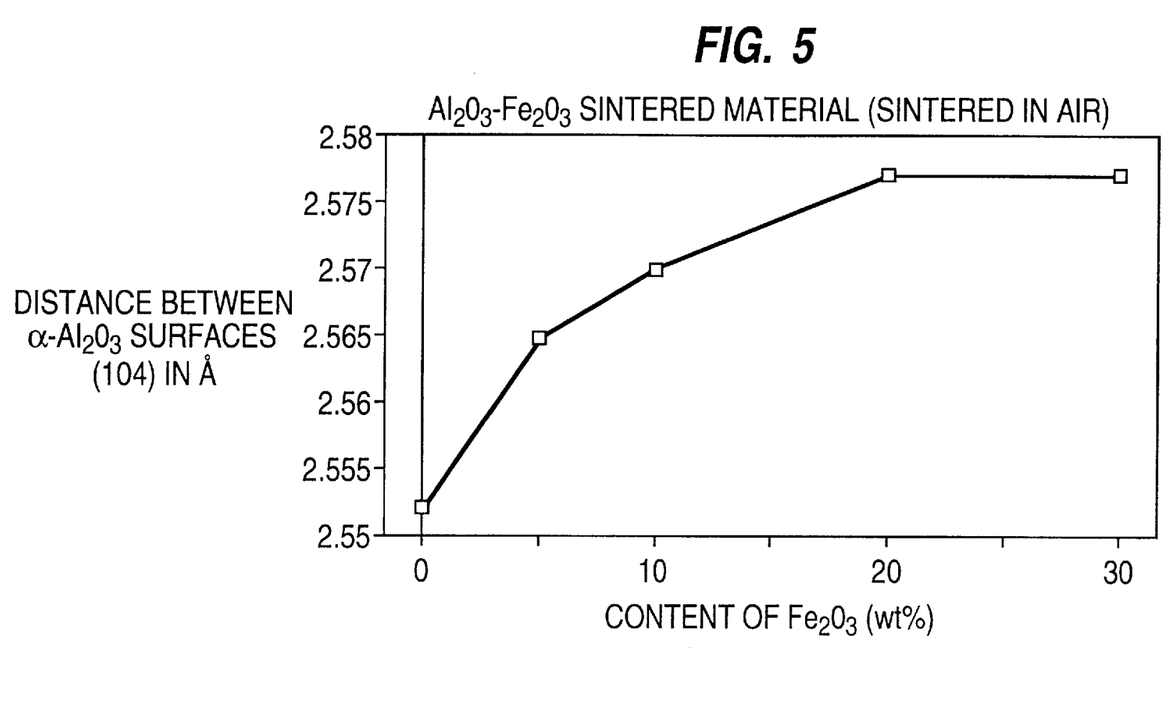
FIG. 5 is a graph showing the relationship between the distance between $\alpha$-$Al_2O_3$ crystal (104) surfaces of an $Al_2O_3$-$Fe_2O_3$ sintered material and the content of $Fe_2O_3$.

Test pieces (test piece Nos. 2–5) were subjected to an X-ray diffraction test. The diffraction chart is shown in FIG. 4. Diffractions resulting from $Fe_2O_3$ crystals were observed in the $Al_2O_3$-$Fe_2O_3$ sintered member containing 20% $Fe_2O_3$. But no such diffractions were observed in the specimens containing 10% or less $Fe_2O_3$. This fact shows that these specimens are practically made up of a single phase of $\alpha$-$Al_2O_3$. FIG. 5 shows the relationship between the distance between surfaces (104) of the $\alpha$-$Al_2O_3$ phase as measured by X-ray diffraction and the content of $Fe_2O_3$. As the content of $Fe_2O_3$ increases up to 20%, the surface distance (104) increases. But in the area where the content of $Fe_2O_3$ is higher than 20%, the surface distance is constant. This fact shows that when the content of $Fe_2O_3$ is 18% or less, $Fe_2O_3$ added completely melts in the $\alpha$-$Al_2O_3$ phase in the form of a solid solution, but if the content is 20% or higher, part of $Fe_2O_3$ may remain unmelted in the form of an $Fe_2O_3$ phase. These changes in the crystal structure correspond to the corrosion behavior of the alumina sintered member against hydrochloric acid.

(EXAMPLES 3, 4 AND 13, COMPARATIVE EXAMPLES 1, 5 AND 6)

A material formed by mixing, as sintering additives, 4 parts by weight of silica, 1 part by weight of magnesia and 1 part by weight of calcia into 90 parts by weight of alumina powder and 10 parts by weight of iron powder (a total of 100 parts) was pelletized in a dry state. The thus pelletized member was compression-molded into the shape of a disk as a valve body (having the shape shown in FIGS. 6 and 7A) or into the shape of a disk as a valve seat (having the shape as shown in FIGS. 6 and 7B). The disk-shaped member thus formed was calcined in an atmospheric furnace at 1600° C. for two hours to form a disk-shaped valve body 29.1 mm in diameter and 9.6 mm thick or a disk-shaped valve seat 35.4 mm in diameter and 4.0 mm thick.

(EXAMPLES 5–8, 14 AND 15, COMPARATIVE EXAMPLES 2, 7 AND 8)

A material formed by mixing, as sintering additives, 4 parts by weight of silica, 1 part by weight of magnesia and 1 part by weight of calcia into 90 parts by weight of alumina powder and 10 parts by weight of iron oxide powder (a total of 100 parts) was pelletized in a dry state. The thus pelletized member was compression-molded to form a disk-shaped member as a valve body or seat of the same size as the above disk-shaped member. The compression-molded disk member was calcined in an atmospheric furnace at 1600° C. for two hours to form a valve body or a valve seat having the same dimensions as the above valve body or seat.

(EXAMPLES 9–11, 16 AND 17, COMPARATIVE EXAMPLES 3 AND 9)

A material formed by mixing, as sintering additives, 4 parts by weight of silica, 1 part by weight of magnesia and 1 part by weight of calcia into 95 parts by weight of alumina powder and 5 parts by weight of iron oxide powder (a total of 100 parts) was pelletized in a dry state. The thus pelletized member was compression-molded to form a disk-shaped member as a valve body and seat of the same size as the above disk-shaped member. The compression-molded disk member was calcined in an atmospheric furnace at 1600° C. for two hours to form a valve body and a valve seat having the same dimensions as the above valve body and seat.

(EXAMPLES 12 AND 18, COMPARATIVE EXAMPLE 4)

A material formed by mixing, as sintering additives, 4 parts by weight of silica, 1 part by weight of magnesia and 1 part by weight of calcia into 80 parts by weight of alumina powder and 20 parts by weight of nickel powder (a total of 100 parts) was pelletized in a dry state. The thus pelletized member was compression-molded to form a disk-shaped member as a valve body and seat of the same size as the above disk-shaped member. The compression-molded disk member was calcined in a nitrogen gas atmosphere at 1600° C. for two hours to form a valve body and seat having the same dimensions as the above valve body or seat.

(COMPARATIVE EXAMPLE 10)

A material formed by mixing, as a sintering additive, 2 parts by weight of $B_4C$ into 100 parts by weight of silicon carbide was pelletized in a dry state. The thus pelletized member was compression-molded to form a disk-shaped member as a valve body and seat of the same size as the above disk-shaped member. The compression-molded disk member was calcined in a nitrogen gas atmosphere at 2100° C. for one hour to form a valve body of porous silicon carbide having the same dimensions as the above valve body. Then, crowns having the heights shown in Table 2 were formed on the sliding surfaces of the valve body and the valve seat by lapping the sliding surfaces with a surface plate lapping machine. The valve body and seat were then impregnated with silicone oil.

As valve bodies and valve seats to be used in combination with the valve bodies and valve seats prepared in the abovementioned Examples and Comparative Examples, or as valve bodies and valve seats for use in Comparative Examples 5 and 6, valve bodies and valve seats made of alumina were prepared. Specifically, a material formed by mixing, as sintering additives, 4 parts by weight of silica and 1 part by weight of magnesia into 100 parts by weight of aluminum oxide was pelletized in a dry state. The thus pelletized member was compression-molded to form disk-shaped members as a valve body and a valve seat of the same size as the above disk-shaped members. The compression-molded disk members were calcined in an atmospheric furnace at 1600° C. for two hours to form a valve body and a valve seat having the same dimensions as the above valve bodies and seats.

Figure 8:
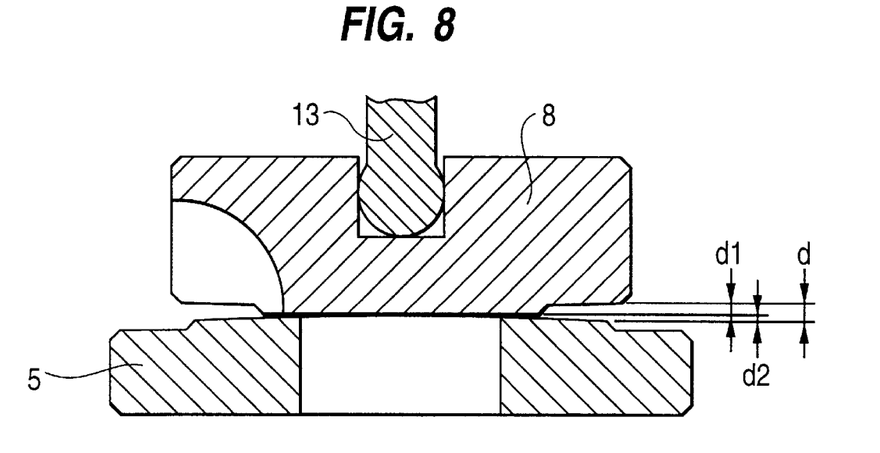
FIG. 8 is a view showing crowns formed on the sliding surfaces of the valve body and the valve seat of the embodiment.

Then, the sliding surfaces of the valve bodies and the valve seats thus obtained were polished with a lapping machine to form crowns rising smoothly from the outer edge and having heights of d1 and d2 (shown in FIG. 8), Their surface roughnesses were measured with a surface roughness tester (made by RANK TAYLOR HOBSON: TALYSURF-6). The results of measurement are shown in Table 2. Their surface roughnesses (Ra) were in the range from 0.01 to 0.05 μm.

The valve bodies and valve seats thus obtained were combined as shown in Tables 2 and 3, and each pair was mounted in the disk valve assembly shown in FIGS. 6 and 7 (single-lever, water-mixing type faucet: KM 300N made by KVK Co.).

The valve bodies and seats mounted in the disk valve assembly were subjected to function/endurance tests to determine the leakproofness and the operability of the lever. The test results are shown in Tables 4 and 5.

(Function/Endurance Tests)

Before the endurance test, the initial leakproofness and the lever operability (lever torque) were determined.

The leakproofness was determined by measuring the amount of drop of the water pressure $kgf/cm^2$ due to water leakage after applying a water pressure of 17.5 $kgf/cm^2$ for 30 seconds with a pump, while keeping the lever in the lower central position (where the supply of water is cut off). If the amount of the pressure fall was less than 0.3 $kgf/cm^2$), the valve was judged to have a passable leakproofness.

In the lever torque test, torque needed to move the lever up and down (to adjust water from zero to maximum) and right and left (to adjust water temperature) was measured using a torque tester (DFG-2K made by Simpo Kogyo). If the torque was in the range from 400 to 800 gf, the valve assembly was judged to be passable. If the torque is less than 400 gf, the lever may move down spontaneously by gravity during use. Where the torque was larger than 800 gf, it was difficult to move the lever smoothly.

Figure 9:
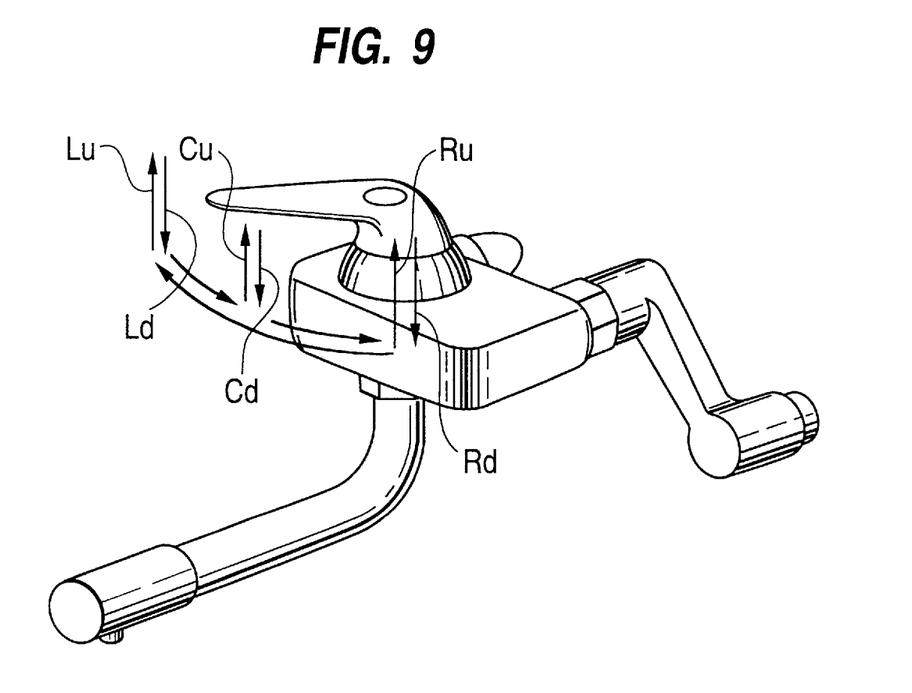
FIG. 9 is a perspective view of a water-mixing type faucet used in function tests.

The lever of each valve assembly used in the initial test was coupled to an endurance tester (made by NTN Engineering Plastics Corporation) and moved, as shown in FIG. 9, from the upper right position Ru (water supply stopped), to the lower right position Rd (cold water supplied), then to lower left Ld (boiling water, 90° C.), to upper left Lu (water stopped), to lower left Ld, to lower center Cd (hot water, 45° C.), to upper center Cu (water stopped), to lower center Cd (hot water, 45° C.), to lower right Rd (cold water), and to upper right position Ru (water supply stopped). This cycle (which took about 25 seconds) was repeated many times. At the 200,000-cycle point, their leakproofness and operability of the lever were determined.

As will be apparent from Tables 4 and 5, Examples 3–18, which satisfy all the requirements, achieved good results in the leakproofness and operability of the lever in the initial function tests. The results of the endurance test was also good. That is, after the 200,000-cycle endurance test, the water pressure dropped only 0.3 $kgf/cm^2$ or less, and the lever operability was high, i.e. the lever torque was within a range of 400–800 gf.

In contrast, for Comparative Examples 2, 3, 4 and 8, in which the crowns formed on the sliding surfaces of the valve body and the valve seat were both higher than the prescribed range, the leakproofness was poor, though the lever operability was good.

For Comparative Examples 1, 2, 4, 7 and 9, in which the total of the heights of the crowns on the valve body and seat exceeded 1.6 μm, the leakproofness was poor, though the lever operability was good.

For Comparative Examples 5 and 6, in which both the valve seat and the valve body were made, not from a self-lubricating ceramic, but from alumina, durability was poor in spite of the fact that the sliding surfaces had prescribed shapes and heights. In fact, endurance tests for these comparative examples had to be aborted due to wringing when the test cycle was repeated 5000 times.

Comparative Example 10, made of silicon carbide ceramic impregnated with silicone oil, was poor in leakproofness, lever operability and durability.

TABLE 1

| Test No. | Composition (wt %) | | Corrosive Liquid | | Loss by Corrosion (mg/cm$^2$) |
|---|---|---|---|---|---|
| | $Al_2O_3$ | $Fe_2O_3$ | | | |
| 1 | 100 | 0 | NaOH | 5N | 5.65 |
| | | | HCl | 5N | 2.63 |
| | | | Water | | 1.25 |
| 2 | 99 | 1 | NaOH | 5N | 0.35 |
| | | | HCl | 5N | 0.76 |
| | | | Water | | 0.00 |
| 3 | 95 | 5 | NaOH | 5N | 0.23 |
| | | | HCl | 5N | 0.48 |
| | | | Water | | 0.00 |
| 4 | 90 | 10 | NaOH | 5N | 0.18 |
| | | | HCl | 5N | 0.37 |
| | | | Water | | 0.00 |
| 5 | 80 | 20 | NaOH | 5N | 0.31 |
| | | | HCl | 5N | 8.49 |
| | | | Water | | 0.00 |

1) These immersion tests lasted 3 days with corrosive liquid kept at 120° C.

TABLE 2

| Example No. | Valve Body Material | Valve Body Convex d1(μm) | Valve Seat Material | Valve Seat Convex d2(μm) |
|---|---|---|---|---|
| 3 | Alumina + 10% Fe | 0.1 | Alumina | 0.3 |
| 4 | Alumina + 10% Fe | 0.4 | Alumina | 0.3 |
| 5 | Alumina + 10% $Fe_2O_3$ | 0.1 | Alumina | 0.3 |
| 6 | Alumina + 10% $Fe_2O_3$ | 0.4 | Alumina | 0.5 |
| 7 | Alumina + 10% $Fe_2O_3$ | 0.9 | Alumina | 0.7 |
| 8 | Alumina + 10% $Fe_2O_3$ | 0.05 | Alumina | 0.05 |
| 9 | Alumina + 5% $Fe_2O_3$ | 0.1 | Alumina | 0.3 |
| 10 | Alumina + 5% $Fe_2O_3$ | 0.5 | Alumina | 0.4 |
| 11 | Alumina + 5% $Fe_2O_3$ | 1.0 | Alumina | 0.6 |
| 12 | Alumina + 20% Ni | 0.5 | Alumina | 0.3 |
| 13 | Alumina | 0.3 | Alumina + 10% Fe | 0.5 |
| 14 | Alumina | 0.3 | Alumina + 10% $Fe_2O_3$ | 0.5 |
| 15 | Alumina | 0.5 | Alumina + 10% $Fe_2O_3$ | 1.0 |
| 16 | Alumina | 0.5 | Alumina + 5% $Fe_2O_3$ | 0.4 |
| 17 | Alumina | 0.5 | Alumina + 5% $Fe_2O_3$ | 1.0 |
| 18 | Alumina | 0.2 | Alumina + 20% Ni | 0.5 |

TABLE 3

| Comparative Example No. | Valve Body Material | Valve Body Convex d1(μm) | Valve Seat Material | Valve Seat Convex d2(μm) |
|---|---|---|---|---|
| 3 | Alumina + 10% Fe | 0.9 | Alumina | 0.8 |
| 2 | Alumina + 10% $Fe_2O_3$ | 1.2 | Alumina | 0.5 |
| 3 | Alumina + 5% $Fe_2O_3$ | 1.3 | Alumina | 0.3 |
| 4 | Alumina + 20% Ni | 1.1 | Alumina | 0.6 |
| 5 | Alumina | 0.1 | Alumina | 0.4 |
| 6 | Alumina | 0.8 | Alumina | 0.4 |
| 7 | Alumina | 1.0 | Alumina + 10% $Fe_2O_3$ | 0.9 |
| 8 | Alumina | 0.2 | Alumina + 10% $Fe_2O_3$ | 1.2 |
| 9 | Alumina | 0.7 | Alumina + 5% $Fe_2O_3$ | 1.0 |
| 10 | SiC + $B_4C$ | 0.35 | Alumina | 0.1 |

TABLE 4

| Item & Test Result | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|
| Amount of Convex d = d1 + d2 | 0.4 | 0.7 | 0.4 | 0.9 | 1.6 | 0.4 | 0.9 | 0.7 | 0.8 | 0.8 | 0.8 | 1.5 | 0.9 | 1.5 | 0.7 | 0.1 |
| Leakproofness* | | | | | | | | | | | | | | | | |
| Initial | 0.10 | 0.15 | 0.15 | 0.20 | 0.26 | 0.11 | 0.20 | 0.13 | 0.19 | 0.18 | 0.18 | 0.26 | 0.22 | 0.25 | 0.18 | 0.08 |
| After Test | 0.16 | 0.22 | 0.20 | 0.25 | 0.29 | 0.23 | 0.20 | 0.19 | 0.28 | 0.24 | 0.23 | 0.30 | 0.27 | 0.26 | 0.25 | 0.12 |
| Operability** | | | | | | | | | | | | | | | | |
| Initial | 680 | 640 | 700 | 590 | 490 | 670 | 590 | 650 | 600 | 620 | 620 | 520 | 580 | 530 | 630 | 710 |
| After Test | 860 | 700 | 840 | 670 | 550 | 870 | 660 | 720 | 670 | 680 | 690 | 600 | 640 | 640 | 700 | 860 |
| Judgement | ○ | ◉ | ○ | ◉ | ◉ | ○ | ◉ | ◉ | ◉ | ◉ | ◉ | ◉ | ◉ | ◉ | ◉ | ○ |

*in $kgf/cm^2$
**in gf

TABLE 5

| Item & Test Result | 1 | 2 | 3 | 4 | 5 | 6 | 7 | 8 | 9 | 10 |
|---|---|---|---|---|---|---|---|---|---|---|
| Amount of Convex d = d1 + d2 | 1.7 | 1.7 | 1.6 | 1.7 | 0.5 | 1.2 | 1.9 | 1.4 | 1.7 | 0.45 |
| Leakproofness* | | | | | | | | | | |
| Initial | 0.50 | 0.72 | 0.76 | 0.68 | 0.12 | 0.26 | 0.68 | 0.41 | 0.53 | 0.17 |

TABLE 5-continued

| | Comparative Example No. Comparative Example | | | | | | | | | |
|---|---|---|---|---|---|---|---|---|---|---|
| Item & Test Result | 1 | 2 | 3 | 4 | 5 | 6 | 7 | 8 | 9 | 10 |
| After Test Operability** | 0.70 | 0.72 | 0.80 | 0.78 | — | — | 0.81 | 0.53 | 0.57 | 0.30 |
| Initial | 350 | 370 | 380 | 680 | 1560 | 930 | 320 | 400 | 460 | 580 |
| After Test | 890 | 610 | 510 | 810 | — | — | 500 | 550 | 590 | 1520 |
| Judgement | Δ | X | X | X | X | X | X | X | Δ | Δ |

*in kgf/cm$^2$
**in gf
— Test Discontinued

What is claimed is:

1. A sintered ceramic material which shows high sliding properties in lubrication with water, said sintered ceramics material being formed by sintering a material comprising an oxide ceramics material, and 1 to 30% by weight of iron or its oxides, nitrides carbides, as an anti-friction agent.

2. A disk valve assembly having a valve seat formed with valve holes and a valve body kept in sliding contact with said valve seat to open and close said valve holes, wherein:
at least one of said valve seat and said valve body is made of a self-lubricating ceramics material comprising as a main component an oxide ceramic and iron or its oxides, nitrides or carbides, as an anti-friction agent.

3. The disk valve assembly as claimed in claim 2 wherein said oxide ceramic is an aluminum oxide ceramic.

4. The disk valve assembly as claimed in claim 2 wherein said valve seat and said valve body have sliding surfaces kept in sliding contact with each other, said each sliding surface being formed with a convex crown rising smoothly from the outer edge of said each sliding surface to a height of 0.1–1 μm at its center, the sum of the heights of said crowns formed on said sliding surfaces being not more than 1.6 μm or less.

5. The disk valve assembly as claimed in claim 2 wherein said crown formed on said sliding surface of said valve seat has a continuous surface with no cutouts or openings at its central portion.

6. A disk valve assembly having a valve seat formed with valve holes and a valve body kept in sliding contact with said valve seat to open and close said valve holes, wherein:
one of said valve seat and said valve body is made of a self-lubricating ceramics material comprising as a main component an oxide ceramic and iron or its oxides, nitrides or carbides, as an anti-friction agent, and the other of said valve seat and said valve body being made of an aluminum oxide ceramic material.

7. A disk valve assembly as claimed in claim 6 wherein said one of said valve seat and said valve body has a smaller slide contact area than that of said other of said valve seat and valve body.

* * * * *